US008457869B2

(12) United States Patent
Wenzel

(10) Patent No.: US 8,457,869 B2
(45) Date of Patent: Jun. 4, 2013

(54) METHOD FOR ASCERTAINING CONSUMPTION AND/OR EMISSION VALUES

(75) Inventor: Thomas Wenzel, Weyher (DE)

(73) Assignee: Siemens Aktiengesellschaft, Munich (DE)

( * ) Notice: Subject to any disclaimer, the term of this patent is extended or adjusted under 35 U.S.C. 154(b) by 442 days.

(21) Appl. No.: 12/680,268

(22) PCT Filed: Sep. 2, 2008

(86) PCT No.: PCT/EP2008/061544
§ 371 (c)(1),
(2), (4) Date: May 12, 2010

(87) PCT Pub. No.: WO2009/043665
PCT Pub. Date: Apr. 9, 2009

(65) Prior Publication Data

US 2010/0305839 A1 Dec. 2, 2010

(30) Foreign Application Priority Data

Sep. 26, 2007 (DE) ......................... 10 2007 045 991

(51) Int. Cl.
*G06F 19/00* (2006.01)

(52) U.S. Cl.
USPC .......................................... 701/117; 701/123

(58) Field of Classification Search
USPC ... 701/117, 123; 187/247, 382, 387; 340/931; 700/40
See application file for complete search history.

(56) References Cited

U.S. PATENT DOCUMENTS

2002/0128751 A1 9/2002 Engstrom et al.
2004/0039517 A1 2/2004 Biesinger et al.
2008/0270519 A1 10/2008 Ekdahl et al.

FOREIGN PATENT DOCUMENTS

DE 10043797 A1 3/2002
DE 10108611 A1 9/2002
DE 10237906 A1 4/2003
EP 0821334 A1 1/1998
JP 2000002553 A 1/2000
WO 0221479 A1 3/2002
WO 2005109273 A1 11/2005

OTHER PUBLICATIONS

Höglund, et al: "Estimating Vehicle Emissions and Air Pollution Related to Driving Patterns and Traffic Calming", Conference "Urban Transport Systems", Online, Jun. 7, 1999-Jun. 8, 1999, pp. 1-10, XP 002507341, Stockholm, Sweden.
Hung, et al: "Review of Vehicle Emissions and Fuel Consumption Modelling Approaches at Signalised Road Network", Online, May 30, 2003, pp. 1-7, XP002507342, Hong Kong, China.

*Primary Examiner* — Thomas Black
*Assistant Examiner* — Luke Huynh
(74) *Attorney, Agent, or Firm* — Laurence A. Greenberg; Werner H. Stemer; Ralph E. Locher

(57) ABSTRACT

A method for ascertaining consumption and/or emission values of at least one vehicle in a traffic area, includes the following steps: determining a number of traffic-technology variables for the traffic area, ascertaining a driving profile of the vehicle based on the traffic-technology variables, assigning an individual consumption and/or emission model and/or a consumption and/or emission model related to the vehicle type group to the driving profile of the vehicle, calculating consumption and/or emission values based on the driving profile and the consumption and/or emission model. In addition, the invention relates to a corresponding method for ascertaining consumption and/or emission values of the vehicle target group of vehicles present in a traffic area and to a method for traffic control employing the consumption and/or emission values. Furthermore, the invention relates to ascertainment systems for ascertaining consumption and/or emission values and to a traffic control system.

11 Claims, 3 Drawing Sheets

METHOD FOR ASCERTAINING CONSUMPTION AND/OR EMISSION VALUES

BACKGROUND OF THE INVENTION

Field of the Invention

The present invention relates to a method for ascertaining consumption values and/or emission values of at least one vehicle or a vehicle target group within a traffic area. Furthermore, said invention relates to a traffic control method in which control rules are generated on the basis of traffic-technology parameters, and on the basis thereof control commands for operating traffic systems are generated. Furthermore, said invention relates to an ascertaining system for ascertaining consumption values and/or emission values of at least one vehicle or vehicle group in a traffic area and to a traffic control system.

In our contemporary societies which are confronted with environmental problems and energy problems, ascertaining and reducing consumption values and/or emission values of traffic systems is assuming an ever greater importance. Specifically road traffic, as one of the main sources of noxious emissions, for example of the greenhouse gas $CO_2$ or of noxious substances such as CO, unburnt hydrocarbons or nitrogen oxides, and as one of the main energy consumers, is at the center of efforts to achieve better emission efficiency and energy efficiency. It is therefore to be expected that road traffic will also be regulated in order to optimize emissions and consumption values, with the aid of, for example, the emission trade which is known from the field of industry, with the objective of controlling road traffic in a way which is oriented toward the environment. In this context, such environmentally orientated traffic control will usually also entail optimization of the traffic flow by freeing up the traffic.

The traffic control systems which are known at present primarily use a limited number of traffic-technology variables as the database for the control process.

Said variables include all the measurable variables which relate to the traffic in a specific traffic area. Examples of the traffic-technology variables used hitherto are the medium speed, average speed and maximum speed of vehicles in a traffic area, travel times, percentages of the time for which vehicles are stationary in a traffic area, absolute or relative traffic densities. Such variables may be respectively specified in either a cross-section-related or link-related fashion.

Cross-section-related variables are those which, at a specific measuring location, cover all the vehicles passing the measuring location. Link-related traffic variables relate to a route section and usually only take into account representative vehicles in the ascertaining of the traffic-technology variables. Both cross-section-related and link-related variables may also relate, for example, to individual lanes of a road.

The primary objective of traffic control systems according to the prior art is, in addition, not environmentally oriented traffic processes but primarily to move as many vehicles as possible safely in the shortest possible time from their location of origin to their destination. Traffic control systems also take into account special influences such as, for example, the passage of priority vehicles such as police vehicles or emergency doctor's vehicles or what are referred to as VIP transportations.

Traffic control systems operate on multiple hierarchy levels. Traffic nodes, for example an intersection, are controlled by a UTC (Urban Traffic Control) system which controls between 20 and 500 intersections. A hierarchy level above this is the traffic management control center responsible for strategies of the traffic control of the individual UTC systems. The traffic control takes place in a generally automated fashion both at the level of the UTC and at the level of the traffic management control center, but as a rule with checking by a responsible decision-making party. This ensures that the traffic control does not take place purely on the basis of automated calculations but rather that the ultimate enabling and checking of the traffic control commands is carried out by a human being.

While the database for the traffic control is therefore tested according to purely traffic-inherent decision criteria with respect to the model and practice, this has hitherto not been the case for a traffic control based on environmental criteria. There is no sufficient database available with which fuel consumption and/or emissions by vehicles in a traffic area could be determined, and until now it has not been sufficiently realized how traffic control rules affect the fuel consumption or the emissions of vehicles within a traffic area.

BRIEF SUMMARY OF THE INVENTION

An object of the invention is therefore to make available a method for ascertaining consumption values and/or emission values of at least one vehicle in a traffic area, which method can serve to provide a database for, for example, traffic-science studies, comparisons of traffic control methods and traffic controls. A further object of the invention is to make available a traffic control method which uses such a database. An object of the present invention is likewise to provide an ascertaining system for ascertaining consumption values and/or emission values of vehicles within a traffic area and a traffic control system for controlling traffic.

This object is achieved by means of a method for ascertaining consumption values and/or emission values according to the claims. Furthermore, this object is achieved by a traffic control method, an ascertaining system, and by a traffic control system as claimed.

A first variant of a method according to the invention for ascertaining consumption values and/or emission values ascertains the consumption values and/or the emission values of at least one individual vehicle in a traffic area with the following steps: determining a number of traffic-technology variables for the traffic area, ascertaining a driving profile of the vehicle on the basis of the traffic-technology variables, assigning an (individual and/or vehicle-type-group-related) consumption model and/or emission model to the driving profile of the vehicle, calculating consumption values and/or emission values on the basis of the driving profile and of the consumption model and/or emission model.

A driving profile is understood to be the velocity of a vehicle plotted against time. The driving profile is therefore primarily dependent on acceleration and/or the braking of the vehicle and furthermore on the speed and also on proportions of time for which the vehicle is stationary during the journey and other influencing factors. Said driving profile can therefore be arrived directly or indirectly from traffic-technology variables.

In the text which follows, a traffic area is understood to be a spatially limited area under consideration in which the development of traffic flows is observed. This may be, for example, the area which comes with the responsibility of a UTC system.

Further definitions relate to vehicles and/or vehicle groups which are understood below as follows:

A vehicle is the smallest unit which is to be considered in a traffic area. The vehicle is understood to be any vehicle which is controlled by a person in the traffic area. For example a semitrailer truck with a trailer is considered to be one vehicle even though it is composed of a plurality of individual vehicles.

A vehicle type denotes a vehicle of a specific manufacturer with a model designation. Further additional information on the model designation, for example the year of construction, the level of motorization and equipment features can, but do not have to be, included in the definition of the vehicle type.

A vehicle type group is in principle a freely definable group of vehicles which are combined to form one coherent unit. A vehicle type group is generally understood to be a classification type of vehicles. For example, the so-called 8+1 classification German standard provides that a vehicle type group differentiates between motorcycles, passenger cars, delivery wagons, passenger cars with a trailer, delivery trucks, delivery trucks with a trailer, semitrailer trucks, buses and other motor vehicles. Since other classification types are possible and exist, all such classifications are subsumed under the term vehicle type group.

A vehicle target group is the number of vehicles which are taken into consideration. A vehicle target group may be composed either of just one vehicle or of all the vehicles in the traffic area. The vehicle target group can often be divided into subgroups. For example, a specific vehicle fleet, for example busses in a local public transportation network can be defined as such a subgroup of the vehicle target group, but also as a vehicle target group itself.

A number of traffic-technology variables are determined with the inventive method described above. Said variables may be acquired by measurement or be defined independently by persons or simulation systems. If a sufficient number of transport-technology variables is available for the traffic area, a driving profile can be ascertained therefrom in a program-assisted fashion or by using measurements for one or more vehicles. In the subsequent step, such a driving profile is assigned a consumption model and/or emission model. Such consumption models and/or emission models are usually based on test series in which the consumption and/or the emissions of a vehicle or of a vehicle type are measured in various driving profiles or classes of driving profiles (for example exemplary driving profiles for stationary traffic, intermittently moving traffic and slowly moving traffic). A consumption value and/or emission value for a specific driving profile can therefore be ascertained by assignment on the basis of the driving profile and the consumption model and/or emission model. Consumption models and/or emission models can likewise be ascertained for vehicle type groups. They are usually acquired on the basis of vehicle-type-specific consumption models and/or emission models which are acquired as described. For example, a specific static distribution of vehicle types can be assumed within a vehicle type group and therefrom a statistical mean of the consumption models and/or emission models. Other averaging methods are also possible.

The advantage of the method described here consists, inter alia, in the fact that consumption values and/or emission values can be calculated and made available in an automated fashion on the basis of reliable measurement values in the form of the consumption model and/or emission model and defined output variables with a sufficient connection to reality (of the driving profile).

According to a second variant of the invention, the method according to the invention is a method for ascertaining consumption values and/or emission values of a vehicle target group of vehicles located in a traffic area as a function of a traffic control state, having the following steps: ascertaining driving profiles of the respective vehicles in the traffic area and/or subgroups of the respective vehicle target group, assigning consumption models and/or emission models to the driving profiles, calculating the consumption values and/or emission values of the individual vehicles and/or of the subgroups, cumulation of the consumption values and/or emission values of all the individual vehicles and/or of all the subgroups of the vehicle target group. This method therefore relates from the outset to a vehicle target group and not to individual vehicles. Driving profiles of the respective vehicles or subgroups can also be ascertained by direct acquisition of the driving profiles without resort to traffic-technology variables. In order to ascertain the consumption values and/or emission values of the vehicle target group, all the individual or subgroup-related consumption values and/or emission values are cumulated at the end of the method.

Furthermore, the invention comprises a traffic control method in which control rules are generated on the basis of traffic-technology parameters, and on the basis thereof control commands for operating traffic systems are generated, wherein consumption values and/or emission values which are acquired with a method according to the invention for ascertaining consumption and/or emission values are used as traffic-technology parameters. By using such a traffic control method, the ascertained consumption values and/or emission values are therefore also included as traffic-technology variables in the generation of control commands. This advantageously ensures, inter alia, that environmental criteria and/or consumption criteria are taken into account in the traffic control.

Furthermore, the invention comprises an ascertaining system for ascertaining consumption values and/or emission values of at least one vehicle in a traffic area, which ascertaining system has at least the following components: a determining unit for determining traffic-technology variables for the traffic area, a driving-profile-ascertaining unit for ascertaining a driving profile of the vehicle on the basis of the traffic-technology variables, an input interface for the data of a consumption model and/or emission model of the vehicle and a computer unit for calculating consumption values and/or emission values on the basis of the driving profile and the consumption model and/or emission model. The determining unit, the driving-profile-ascertaining unit and the computer unit are implemented in such an ascertaining system as, for example, software on a program-controlled processor, but can also comprise hardware components. Both an input socket for an input cable, for example for connection to a network, and a software interface between the software modules and/or computer hardware modules can serve as the input interface. A standard hardware interface which is configured by means of suitable software may also be used.

An ascertaining system for ascertaining consumption values and/or emission values can also be embodied in such a way that said ascertaining system serves for ascertaining consumption values and/or emission values of a vehicle target group of vehicles located in a traffic area as a function of a traffic control state, and has at least the following components: a driving-profile-ascertaining unit for ascertaining driving profiles of individual vehicles and/or subgroups of the vehicle target group, an input interface for the data of consumption models and/or emission models, an assigning unit for assigning consumption models and/or emission models to driving profiles, a computer unit for calculating consumption values and/or emission values, a cumulating unit for cumulating the consumption values and/or emission values of individual vehicles and/or subgroups of the vehicle target group. The cumulation unit for cumulating the consumption values and/or emission values can also be embodied, like the other units already mentioned, either as software or as a stand-alone hardware unit.

Furthermore, the invention relates to a traffic control system for controlling traffic, which has at least the following: an input interface for traffic-technology parameters, an ascertaining system according to the invention for ascertaining consumption values and/or emission values, a rule-generating unit for generating control rules, which is embodied in such a way that it generates control rules at least from the consumption values and/or emission values which are generated by the ascertaining system, and a control-command-generating unit for generating control commands for operating traffic systems on the basis of the control rules.

Traffic-technology parameters are understood here to be not only the traffic-technology variables mentioned at the beginning but also other kinds of parameters such as, for example, traffic control variables, weather data and all other values and information relating to the traffic in a traffic area. Such a traffic control system may be embodied, for example, as a UTC system or as a traffic management system of a control center into which all the relevant traffic-technology parameters which are acquired in the traffic area are input. By means of the ascertaining system according to the invention, consumption values and/or emission values which the rule-generating unit uses, if appropriate together with other variables, as a basis for generating control rules, are fed into the traffic control system. As a result, the control commands which are generated by the control-command-generating unit can be matched in such a way that environment-oriented and consumption-oriented criteria are input into the traffic control of the traffic control system. As a result, a traffic control system according to the invention can optimize traffic processes to such an extent that the fuel consumption or the emissions of obnoxious substances are as low as possible, in contrast to previous methods in which optimization was performed only with respect to traffic flow.

Furthermore the ascertaining system, the input interface, the rule-generating unit and the control-command-generating unit can be implemented as software or may be provided entirely or partially as individual hardware components.

Further particularly advantageous refinements and developments of the invention emerge from the dependent claims and the following description. In this context, the ascertaining system and/or traffic control system according to the invention can also be developed in accordance with the dependent claims to form the method for ascertaining consumption values and/or emission values. The same applies to the traffic control method.

According to one particularly preferred embodiment of the first variant of the described method, consumption values and/or emission values of a vehicle target group are ascertained from the cumulated consumption values and/or emission values of individual vehicles. This corresponds to a particularly preferred embodiment of the second variant of a method according to the invention, in which a number of traffic-technology variables is determined for the traffic area, and the driving profiles of the respective vehicles and/or the subgroups of the vehicle target groups are ascertained on the basis of the traffic-technology variables. The object of investigation of such a method is therefore a number of vehicles whose consumption values and/or emission values are combined by addition or, if appropriate, multiplication of the consumption values and/or emission values of the individual vehicles to form a spectrum of consumption values and/or emission values of the totality of the vehicles of the vehicle target group. The advantage of this embodiment is that, inter alia, for the first time specific conclusions can be drawn about consumption and/or emissions of relatively large numbers of vehicles in a traffic area.

Basically, according to the invention, individual allocation of, in each case, one consumption model and/or emission model to a driving profile of, in each case, one vehicle is possible. In one particularly preferred embodiment of a method according to the invention, the individual vehicles and/or the subgroups of the vehicle target group are allocated to a vehicle type group, and then a vehicle-type-group-related consumption model and/or emission model is assigned to the driving profiles of the vehicles of the vehicle type group. As a result, there is no need for individual vehicle recognition, which makes the method significantly simpler. It is then also possible, for example, to calculate consumption values and/or emission values for each vehicle type group and to add the consumption values and/or emission values of the respective vehicle type groups to form vehicle-target-group-specific consumption values and/or emission values. In a practical example this means that vehicles of a vehicle target group which are included in the consideration are divided into vehicle type groups according to certain criteria. For example, the previously mentioned 8+1 classification serves as a vehicle type group. A consumption model and/or emission model is then assigned to a vehicle type group instead of to each individual vehicle. A series of consumption values and/or emission values for each individual vehicle type group is generated therefrom with reference to the driving profiles of the vehicles of the vehicle type group. In this context, the consumption values and/or emission values can be calculated in respective different ways on a vehicle-type-group-specific basis. For example, the driving profiles of trucks, which are defined as a vehicle type group, can be ascertained individually per vehicle on the basis of the electronic tachograph and by transmission via the radio network of a toll system, while for other vehicle type groups such as, for example, passenger cars, an average driving profile could be assumed. An advantage of this method is, inter alia, the fact that instead of one consumption model and/or emission model per vehicle, consumption models and/or emission models are combined to form vehicle type groups, and they can therefore be a saving in terms of timing capacity and computer capacity. This advantage proves its worth in particular when there are large traffic areas under consideration in which ascertaining driving profiles takes up a large processing capacity.

According to one particularly advantageous development of this embodiment, the allocation of the individual vehicles and/or of the subgroups of the vehicle target group to a vehicle type group is carried out by means of pattern recognition based on measurement data acquired in the traffic area. It is therefore possible, for example by image recognition from a video monitoring means, to allocate individual vehicles automatically to a vehicle type group. Simple image patterns are sufficient for this. Other determination possibilities include the identification of vehicles on the basis of their weight or on the basis of the number and the sequence of their axles and/or tires. For example, if a truck with a trailer travels over an induction loop which is integrated into a roadway, a significantly different measurement signal pattern is generated thereby than in the case of a passenger car or a motorcycle. A possible advantage of this development is that it makes it possible to detect vehicles on a precise, individual basis and assign them to vehicle type groups without a large amount of additional expenditure.

According to one particularly preferred embodiment of the invention, the number of vehicles of a vehicle type group within the vehicle target group is ascertained using an estimate. For this purpose, it is preferably possible to use information about static distributions of the proportions of vehicle types and/or vehicle type groups in the traffic volume within a geographic area and/or within the traffic area. The distribution of vehicle types or vehicle type groups varies significantly depending on the traffic area investigated and/or as a function of the geographic area in which a specific traffic area is located. It is therefore to be expected, for example, that in long distance traffic there is a significantly higher proportion of trucks in the total traffic volume than in city traffic.

For many geographic areas or traffic areas there are statistical records available, for example based on the counting of traffic, vehicle registration and licensing data, automatic number plate recognition (ANPR) or other methods. These data are often so detailed that they even include vehicle types—even as far as specifying the precise type—or even a model designation with a registration and licensing year and the level of motorization. These data can be utilized by the invention insofar as they permit conclusions to be drawn as to how many vehicles can be allocated to a vehicle type group or even to a vehicle type of a vehicle target group in a traffic area without acquiring information on individual vehicles in a traffic area. Even if this method comprises an estimate, it nevertheless has the advantage that it can be used to obtain relatively precise information. A further advantage of this method is that a database for the calculation of the consumption values and/or emission values is made available without a relatively large amount of expenditure on measurement.

According to one particularly preferred embodiment of the method, individual vehicle types of the vehicle target group are identified by means of pattern recognition. Recognition of vehicle types is directly possible, for example, by means of image recognition or by detecting number plates, wherein the numbers are input into a database and a vehicle type information item is interrogated. By means of this method it is possible to determine in detail which vehicle types are present within a vehicle target group. It is also not excessively costly in view of the detailed accuracy which can be achieved therewith.

According to one particularly preferred method, consumption models and/or emission models based on vehicle-type-related data are used. Before their registration and licensing for general traffic, vehicle types are generally subjected to extensive test series from which, inter alia, detailed vehicle-type-related consumption models and/or emission models result. These vehicle-type-related consumption models and/or emission models constitute a very precise database. Furthermore, their use provides the advantage that such data are available for virtually any currently customary vehicle type, with the result that there should not be any gaps in the calculation of the consumption values and/or emission values in a traffic area.

According to one particularly preferred embodiment of the invention, the consumption values and/or emission values are ascertained for different traffic control states in a defined traffic scenario, and consumption comparison values and/or emission comparison values of the different traffic control states are ascertained. These consumption comparison values and/or emission comparison values can, for example, be difference values or the ratio values of the consumption values and/or emission values which have been ascertained for the different traffic control states.

A “traffic control state” is defined by the fact that traffic control components such as, for example, road signs, traffic light systems, mobile displays and many more are controlled according to a certain scheme. If the control of just one traffic control component changes, another traffic control state is present.

In contrast, “traffic scenario” or “traffic state” defines a state which is produced by traffic-technology variables and further influencing factors which result from other types of organizational and environment-induced conditions. It therefore describes, inter alia, a current traffic system or anticipated traffic system including information on how many vehicles are moving where and in what way. A traffic scenario includes, in particular, models in which priority vehicles such as VIP transportations are present in the traffic area or planned there, as well as weather influences. By using this embodiment of the invention it is possible to reconcile different possibilities of the traffic control for a traffic scenario with one another. For this purpose, the effects of the respective current or planned traffic control states on the traffic are ascertained and the resulting consumption values and/or emission values are compared with those of other traffic control states, for example by subtracting the consumption values and/or emission values from one another or forming a ratio between them.

According to one particularly preferred embodiment of the invention, the driving profiles are simulated and/or a traffic control state comprises a model which is, if appropriate, virtual. The ascertaining of consumption values and/or emission values on the basis of simulated driving profiles or models of a traffic control state can assist traffic planners, or persons concerned with controlling traffic, in the optimization of traffic processes as a preliminary part of planning and control operations. It is therefore possible, for example on the basis of driving profiles which have been simulated in advance or traffic control states which have been modeled in advance, to determine how the traffic control in a traffic area can be optimized, wherein the traffic control can relate here in particular also to static traffic control means, for example road signs. Modeling of traffic control states, if appropriate including simulated driving profiles, can also be used to demonstrate traffic control effects, in particular with regard to emission values and/or consumption values, for political decision makers and users of traffic control programs.

One particularly advantageous development consists in the fact that a traffic scenario itself comprises a model. A traffic scenario which is modeled in a virtual fashion may, for example, be, as a preliminary part of town planning, the design of a planning office which relates to the configuration of a traffic intersection. With regard to such a traffic intersection, there is, for example, preliminary modeling of which traffic numbers will result from a specific configuration, for example how many vehicles are to be expected at specific times of the day (midday, in the evening, at rush hour etc.) or how a VIP transportation with priority control affects the traffic scenario. With the method it is therefore advantageously possible to draw environmentally relevant conclusions about which emissions and/or consumption values are to be expected in such a traffic scenario given different traffic control states.

According to one particularly preferred embodiment, at least some of the driving profiles are ascertained using a vehicle locating system. Vehicle locating system such as, for example, the global positioning system or Galileo or such as can be used, for example, within the scope of toll systems, for example toll systems for trucks, are defined, inter alia, by the fact that they exchange data between a vehicle and a receiver in a virtually continuous connection. Determining the location of the vehicles by means of the vehicle locating system permits at the same time conclusions to be drawn about the speeds thereof and as a result indirectly about their acceleration behavior. The use of traffic locating systems for assisting a method according to the invention therefore provides the possibility of generating precise data of the diving profile for individual vehicles and of therefore making available a very good database for the calculation of the consumption values and/or emission values. Furthermore, the use of vehicle locating systems has the advantage that it is possible to have recourse to existing, established communication infrastructure, for which reason there would not be any appreciable additional costs.

According to one further advantageous embodiment of the invention, the driving profiles are ascertained using a number of measuring systems mounted in the traffic area. Measuring systems may basically be any types of sensors which are mounted in the traffic area. Video-monitoring systems, induction loops in the carriageway, speed-measuring systems and local locating systems and radio systems are examples of this. Such systems which are often present in any case in the traffic area can contribute to ascertaining driving profiles from individual vehicles but also from vehicle groups. A particular advantage is to be seen in the fact that already existing measuring systems supply data which make available a precise, and, above all real image of the traffic scenario in a traffic area.

BRIEF DESCRIPTION OF THE SEVERAL VIEWS OF THE DRAWING

The invention will be explained in more detail below once more with reference to the accompanying figures and on the basis of exemplary embodiments. Identical components are provided with identical reference symbols in the various figures.

In the drawings.

DESCRIPTION OF THE INVENTION

Figure 1:
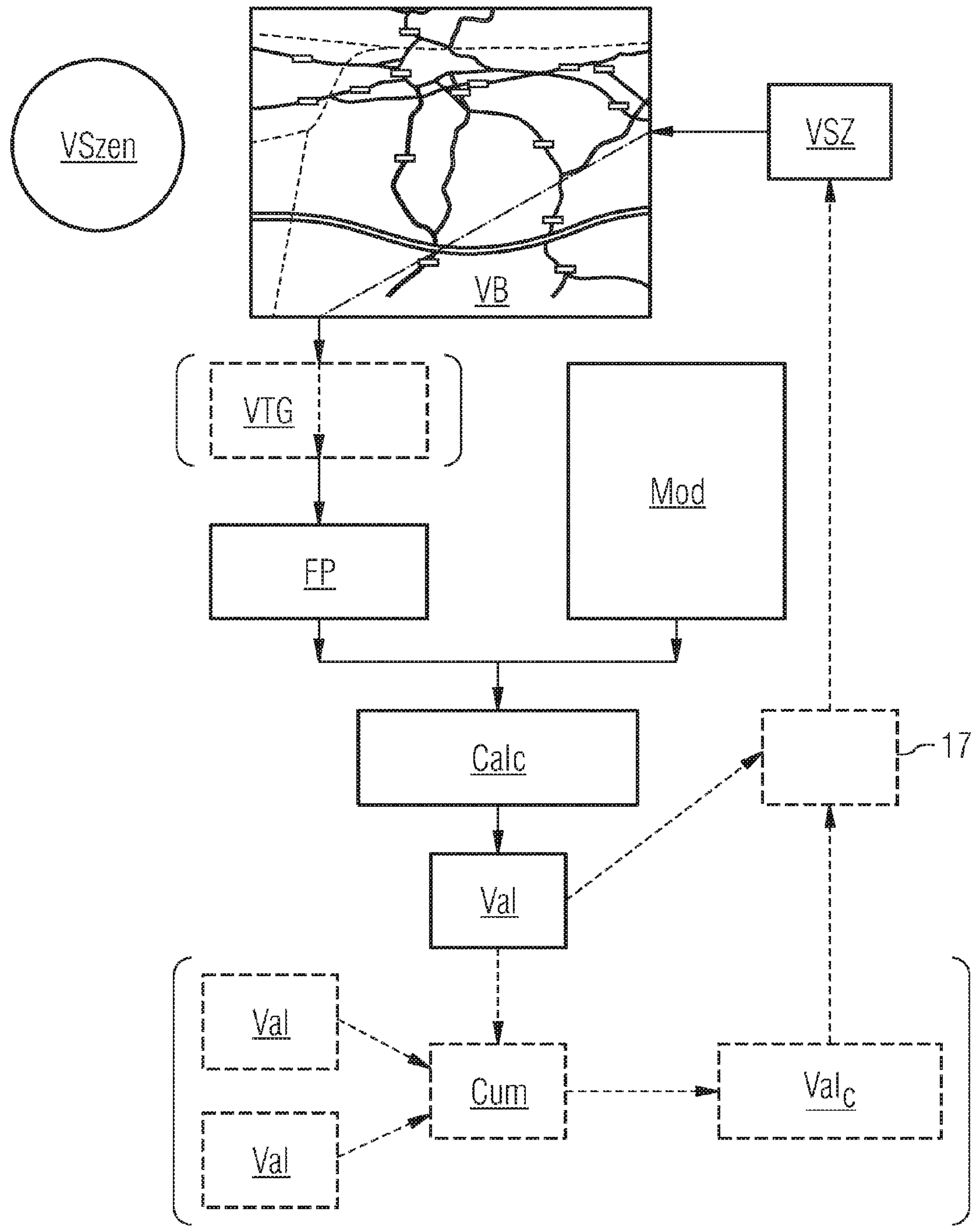
FIG. 1 is a schematic illustration of a method according to the invention for ascertaining consumption values and/or emission values.

FIG. 1 illustrates schematically a method according to the invention for ascertaining consumption values and/or emission values of vehicles within a traffic area for a vehicle or for a vehicle target group. A traffic area VB, here the geographic area of a part of a town with freeways, through-roads and roads in residential areas as well as with a plurality of intersections and a bypass, is investigated in more detail with respect to consumption values and/or emission values.

A traffic scenario VSzen is obtained for the traffic area VB. For a vehicle in the traffic area VB with the traffic scenario VSzen, a driving profile FP is obtained by taking into account the traffic control state VSZ. This driving profile FP can, if appropriate, be ascertained on the basis of traffic-technology variables VTG or can be generated independently, using random data, if appropriate.

The driving profile FP can relate to an individual vehicle or to a vehicle target group or subgroups thereof. An individual and/or a vehicle-type-group-related consumption model and/or emission model Mod is assigned to the driving profile FP and consumption values and/or emission values Val are determined therefrom in a calculation Calc.

Such consumption models and/or emission models Mod for a vehicle type are generated, for example, in test series. Here, for example, consumption values and/or different emission values are plotted against the engine speed and/or against the speed. Furthermore, the average working pressure can be included in the consideration as a measurement variable which represents the loading of the engine in a driving situation. It is therefore possible to respectively allocate consumption values and emission values to each rotational speed or each speed of a vehicle. Such consumption models and/or emission models Mod are usually available in diagram form or table form, preferably also electronically in the form of a file. Such diagrams then have, for example, rotational speed ranges or speed ranges—similar to the isobars on a map—which respectively represent an equal consumption or equal emission values.

If such a consumption model or emission model is assigned to the driving profile FP and if the assigned values are integrated over a defined driving time, the consumption values and emission values Val of the vehicle in this driving time are obtained. An ascertaining system according to the invention for ascertaining consumption values and/or emission values Val is preferably equipped with or linked to a comprehensive database of such consumption models and/or emission models Mod for various vehicle types.

In one cumulation Cum, consumption values and/or emission values Val of further vehicles or subgroups can optionally be combined, with the result that cumulated consumption values and/or emission values $Val_c$ are obtained.

The (cumulated) consumption values and/or emission values Val and/or $Val_c$ can subsequently be fed into a traffic control system 17 which, on the basis of these data, can generate traffic control rules by means of which the traffic control state VSZ is changed.

Figure 2:
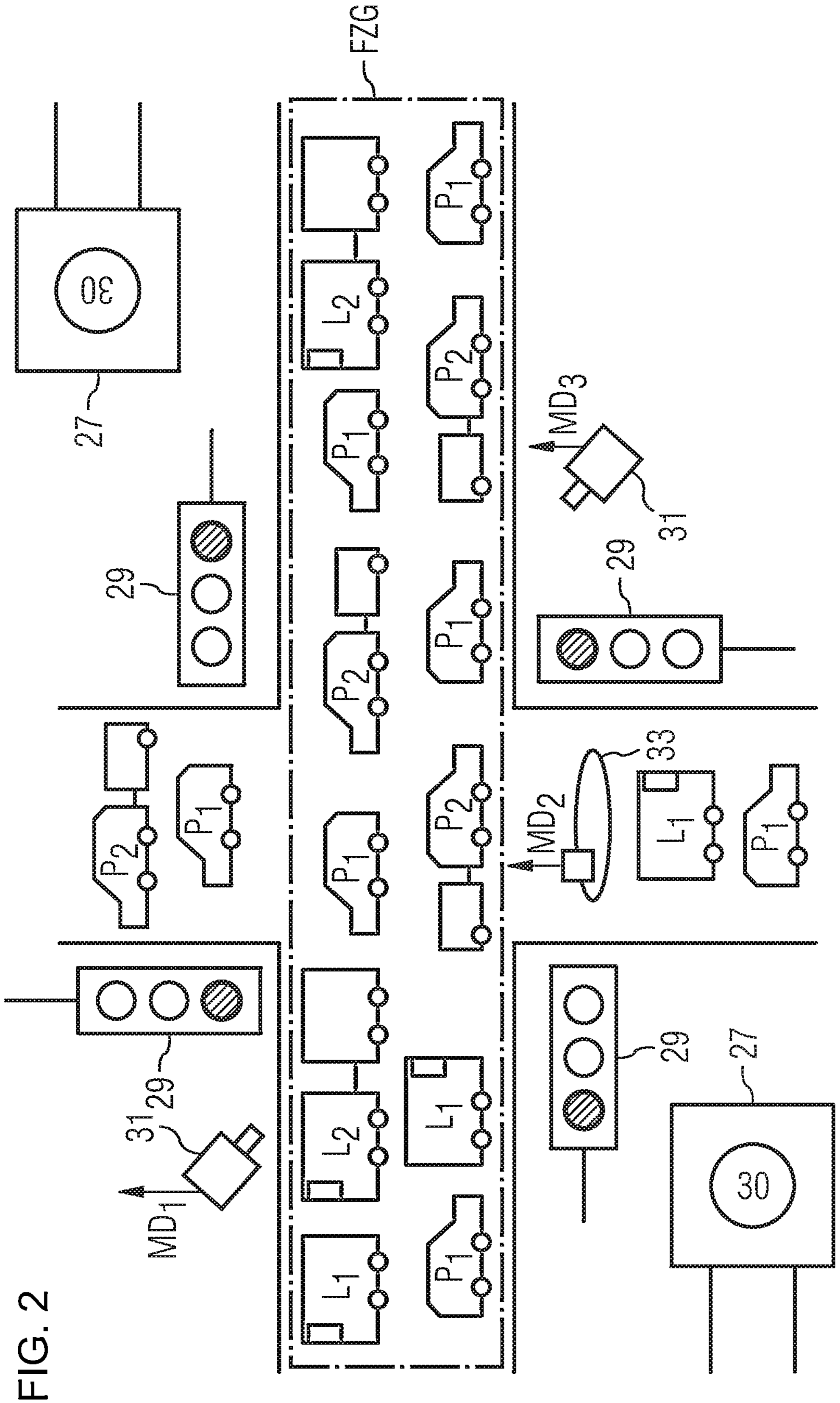
FIG. 2 is a schematic illustration of a traffic area with vehicles and traffic control components.

FIG. 2 illustrates another traffic area VB' which comprises an intersection with traffic light systems. In the traffic area VB' there is a plurality of vehicles $L_1$, $L_2$, $P_1$, $P_2$. Two display panels 27, on which a variably adjustable speed limit, which is set here to 30 km/h, can be displayed, serve as traffic control elements. Furthermore, four traffic light systems 29 serve for traffic control. The two traffic light systems 29, which are provided for the traffic which extends in the horizontal direction in the image, are set to green in the example, while the other two traffic light systems 29, which are responsible for the vertically extending traffic in the illustration, are set to red. Furthermore, two monitoring cameras 31 and an induction loop 33 are provided as measuring systems in the roadway. They transmit measurement data $MD_1$, $MD_2$, $MD_3$, to a traffic-monitoring system and/or to a traffic control system.

A vehicle target group FZG which is to be investigated is composed here of all the vehicles $L_1$, $L_2$, $P_1$, $P_2$ which are moving in the horizontal direction in the image. The vehicles $P_1$, i.e. here passenger cars without a trailer, can be allocated to a first vehicle type group, the vehicles $P_2$, i.e. here passenger cars with a trailer, can be assigned to a second vehicle type group, the vehicles $L_1$, i.e. here trucks without a trailer, can be allocated to a third vehicle type group, and the vehicles $L_2$, i.e. here trucks with a trailer, can be allocated to a fourth vehicle type group.

In the illustrated traffic scenario, it can be assumed that the vehicles which are associated with the vehicle target group FZG and which are traveling in one direction, i.e. the vehicles of a subgroup which are traveling with a right-left orientation in the illustration, and the vehicles of a second subgroup, which are traveling with a left-right orientation, respectively approximately have one driving profile. Insofar as they are associated with one vehicle type group, it can be assumed therefore that they have approximately the same consumption values and/or emission values.

The consumption values and/or emission values of the vehicle target group FZG are therefore obtained as follows: either each vehicle $P_1$, $P_2$, $L_1$, $L_2$ can be assigned an individual driving profile and/or an individual consumption model and/or emission model. The consumption values and/or emission values of the vehicles of the vehicle target group FZG are then calculated by addition of the consumption values and/or emission values which are ascertained for each vehicle $P_1$, $P_2$, $L_1$, $L_2$. The consumption values and/or emission values of all the vehicles of the vehicle target group FZG can, however, also be ascertained by performing differentiation according to vehicle type groups for the subgroups of the vehicles with the leftward orientation or with the rightward orientation, and by assigning a common driving profile and a common consumption model and/or emission model for each vehicle type group within a subgroup. For example, the vehicles $P_1$ which are oriented to the left have a common driving profile and a common consumption model and/or emission model on the basis of which consumption values and/or emission values can be ascertained jointly for all the vehicles $P_1$. The same applies to the vehicles $P_2$, $L_1$ and $L_2$ which are oriented toward the left. The consumption values and/or emission values of the subgroup of the vehicles which are oriented toward the left are therefore obtained from the cumulation of the consumption values and/or emission values of the vehicles $P_1$/$P_2$, $L_1$ and $L_2$ which are associated with a vehicle type group and which can be determined in one step. The consumption values and/or emission values of all the vehicles $P_1$, $P_2$, $L_1$ and $L_2$ of the vehicle target group FZG are ascertained by adding the consumption values and/or emission values of the subgroup of the vehicles $P_1$, $P_2$, $L_1$ and $L_2$ which are oriented toward the left, and of the subgroup of the vehicles $P_1$, $P_2$, $L_1$ and $L_2$ which are oriented toward the right.

The traffic scenario in the traffic area VB' can be changed by virtue of the fact that a different traffic control state is brought about. For example, the display panels 27 can be switched over from a speed limit of 30 km/h to a speed limit of 50 km/h, or the switching operations of the traffic light systems 29 can be varied in their clocking frequency. This results in a different traffic flow of the vehicles $P_1$, $P_2$, $L_1$, $L_2$, which changes the driving profiles of the vehicles in the vehicle target group FZG. The associated change in the overall consumption and the overall emissions can be tracked using the method according to the invention. For this purpose, the consumption values and/or emission values of the vehicles $P_1$, $P_2$, $L_1$, $L_2$ which are associated with the vehicle target group FZG and which have been ascertained for the different traffic control states are subtracted from one another or a ratio is formed between them.

The traffic area VB' which is illustrated here and the illustrated traffic scenario as well as the traffic control state can be present in real form and be detected, for example, by the measuring system by means of the induction loop 33 and the monitoring cameras 31, and can be fed into an ascertaining system according to the invention. However, such a scenario can also be simulated in a virtual fashion. Likewise, a traffic control state and/or the driving profiles of individual vehicles $P_1$, $P_2$, $L_1$, $L_2$ or of vehicle groups can be simulated.

Figure 3:
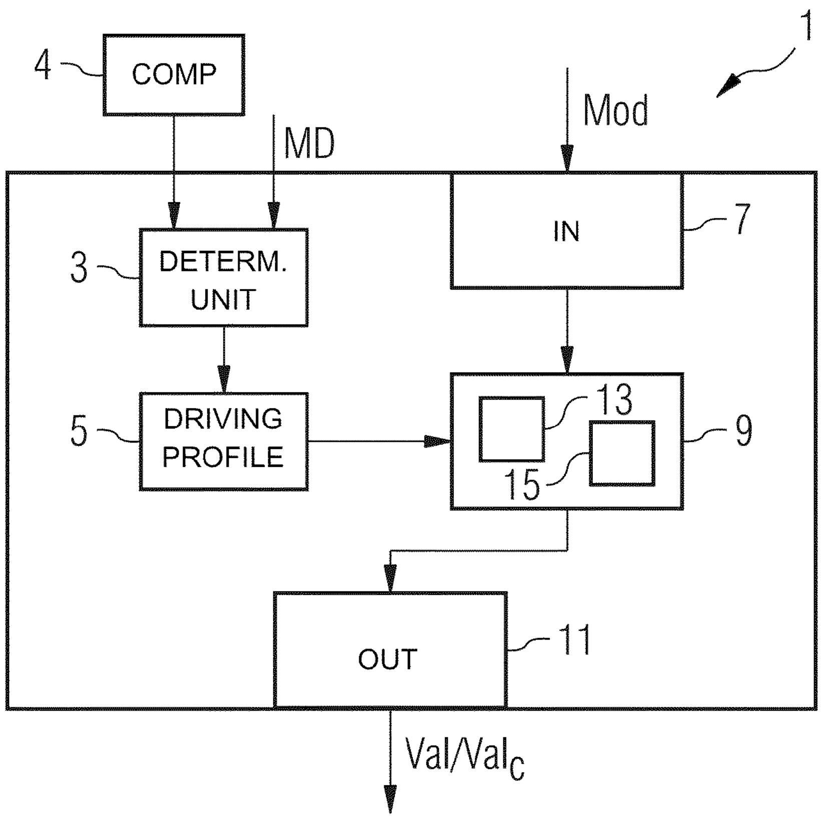
FIG. 3 is a schematic design of an ascertaining system according to the invention.

FIG. 3 illustrates an ascertaining system 1 according to the invention. A determining unit 3 for determining traffic-technology variables, a driving profile-ascertaining-unit 5, an input interface 7 for the data of a consumption model and/or emission model, a computing unit 9 for calculating consumption values and/or emission values and an output interface 11 are integrated therein. An assigning unit 13 for assigning consumption models and/or emission models to driving profiles and a cumulating unit 15 are optionally arranged within the computer unit 9.

Data of a consumption model and/or emission model Mod and optionally measured values MD and data of a computer system 4 are fed into the ascertaining system 1. The determining unit 3 determines traffic-technology variables for a traffic area.

This can be done by evaluating measured values MD from measurement systems within the traffic area, but also by inputting data into a terminal of a computer system 4 or via a network. A traffic scenario, driving profiles, traffic control parameters and/or other traffic-related data and parameters are fed into the determining unit 3 from these data sources. A driving-profile-ascertaining unit 5 ascertains from the traffic-technology variables, which have been determined in the determining unit 3, the driving profile of a vehicle or of a vehicle target group or of the subgroups thereof. Data of a consumption model and/or emission model Mod are fed via the input interface 7 into the ascertaining system 1 from where they are fed into a computer unit 9. The computer unit 9 processes the driving profiles from the driving-profile-ascertaining unit 5 in combination with the consumption models and/or emission models Mod from the input interface 7 and calculates therefrom consumption values and/or emission values Val and/or $Val_c$ of the investigated individual vehicle or of the vehicle target group and/or the subgroups thereof. For this purpose, it is possible to provide the assignment unit 13 which assigns consumption models and/or emission models Mod to the driving profiles. The cumulating unit 15 can cumulate the individual consumption values and/or emission values of the vehicles and/or subgroups to form a consumption value and/or emission value $Val_c$ of all the vehicles of the vehicle target group.

These consumption values and/or emission values Val, $Val_c$ can be output via the output interface 11 implemented in the form of hardware and/or software to, for example, representation devices such as printers, monitors or the like, or to a traffic control system which generates, on the basis of the consumption values and/or emission values, control rules SR and control commands SB for operating traffic systems.

Figure 4:
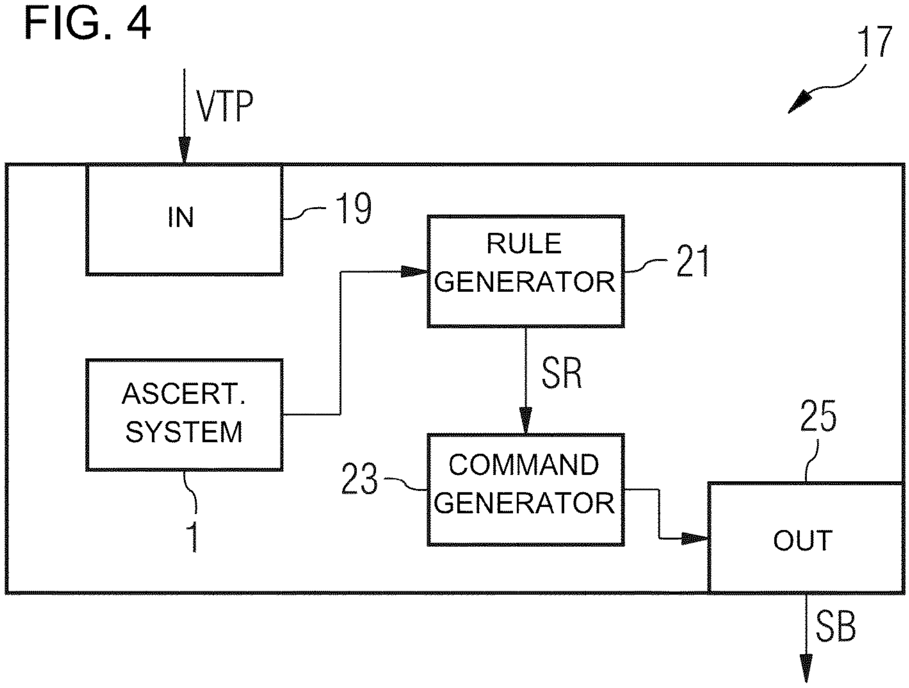
FIG. 4 is a traffic control system according to the invention in a schematic view.

FIG. 4 shows a traffic control system 17 according to the invention. It has an input interface 19 for traffic-technology parameters VTP, as well as an ascertaining system 1 for ascertaining consumption values and/or emission values, a rule-generating unit 21 for generating control rules SR, a control-command-generating unit 23 for generating control commands SB for operating traffic systems, and an output interface 25.

Certain traffic-technology parameters VTP, primarily parameters which are conventionally used in traffic control systems, i.e. ultimately all variables which are known for this purpose apart from consumption values and emission values, are fed into the traffic control system 17 via the input interface 19. These consumption values and/or emission values Val, $Val_c$ from a traffic area are additionally fed by the ascertaining system 1 into the traffic control system. A rule-generating unit 21 is used to generate control rules SR which are based at least on the consumption values and/or emission values which have been ascertained in the ascertaining system 1. The control-command-generating unit 23 processes the control rules SR to form control commands SB for operating traffic systems. These control commands SB are passed onto traffic systems via the output interface 25 which can be implemented in the form of hardware (output socket) and/or software.

To conclude, it should once more be noted that the method described in detail above and the ascertaining system and traffic control system illustrated are merely exemplary embodiments which can be modified by a person skilled in the art in various ways without departing from the scope of the invention.

The invention claimed is:

1. A method for ascertaining consumption values and/or emission values of a vehicle target group of vehicles located in a given traffic area as a function of a traffic control state, the method which comprises the following steps:

ascertaining driving profiles of the respective vehicles in the traffic area and/or subgroups of the respective vehicle target group;

assigning consumption models and/or emission models to the driving profiles;

calculating the consumption values and/or emission values of the individual vehicles and/or of the subgroups;

cumulating the consumption values and/or emission values of all the individual vehicles and/or of all the subgroups of the vehicle target group;

determining a plurality of traffic-technology variables for the given traffic area;

ascertaining the driving profiles of the respective vehicles and/or the subgroups of the vehicle target group on a basis of the traffic-technology variables;

allocating individual vehicles and/or subgroups of a vehicle target group to a vehicle type group; and assigning a vehicle type group-related consumption model and/or emission model to the driving profiles of the vehicles of the vehicle type group.

2. The method according to claim 1, wherein the allocating step comprises acquiring measurement data in the traffic area and allocating the individual vehicles and/or the subgroups of the vehicle target group to the vehicle type group by way of pattern recognition based on the measurement data acquired in the traffic area.

3. The method according to claim 1, which comprises ascertaining a number of vehicles of a vehicle type group within the vehicle target group by using an estimate.

4. The method according to claim 1, which comprises using consumption models and/or emission models based on vehicle type-related data.

5. The method according to claim 1, which comprises identifying individual vehicle types of the vehicle target group by way of pattern recognition.

6. The method according to claim 1, which comprises ascertaining the consumption values and/or emission values for different traffic control states in a defined traffic scenario, and ascertaining consumption comparison values and/or emission comparison values of the different traffic control states in the traffic scenario on the basis of the consumption values and/or emission values.

7. The method according to claim 1, wherein the driving profiles are simulated and/or a traffic control state comprises a model.

8. The method according to claim 1, which comprises ascertaining driving profiles using a vehicle locating system.

9. The method according to claim 1, which comprises ascertaining the driving profiles using a plurality of measurement systems mounted in the traffic area.

10. A traffic control method, which comprises:

performing the method according to claim 1 to acquire traffic-technology parameters in the form of consumption values and/or emission values; and generating control rules on the basis of the traffic-technology parameters; and generating control commands for operating traffic systems based on the control rules.

11. A traffic control system for controlling traffic systems, comprising:

an input interface for traffic-technology parameters;

an ascertaining system for ascertaining consumption values and/or emission values of a vehicle target group of vehicles located in a given traffic area in dependence on a traffic control state;

a rule-generating unit connected to said ascertaining system, said rule-generating unit generating control rules using the consumption values and/or the emission values generated by said ascertaining system; and a control-command-generating unit connected to said rule-generating unit for generating control commands for operating traffic systems on a basis of the control rules;

said ascertaining system comprising:

a driving-profile-ascertaining unit for ascertaining driving profiles of individual vehicles and/or subgroups of the vehicle target group;

an input interface for receiving data of consumption models and/or emission models;

an assigning unit for assigning consumption models and/or emission models to driving profiles;

a computer unit for calculating consumption values and/or emission values; and a cumulating unit for cumulating the consumption values and/or the emission values of individual vehicles and/or subgroups of the vehicle target group.

* * * * *